Patented Mar. 14, 1950

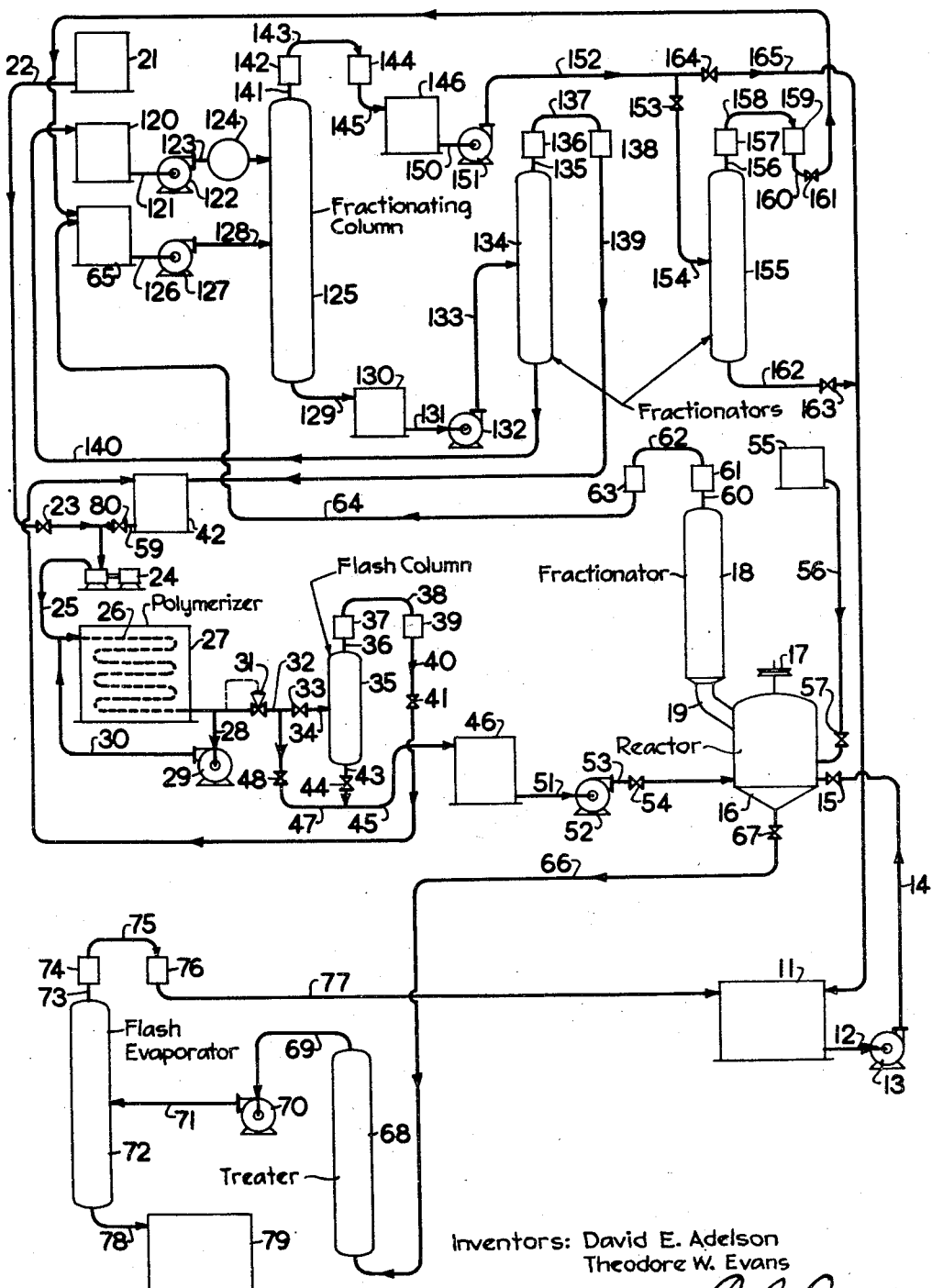

2,500,596

UNITED STATES PATENT OFFICE 2,500,596

EXTRACTIVE DISTILLATION PROCESS FOR SEPARATING THE AZEOTROPIC DISTILLATE MIXTURE OF ALLYL ALCOHOL AND ALLYL ACETATE

David E. Adelson, Berkeley, and Theodore W. Evans, Oakland, Calif., assignors to Shell Development Company, San Francisco, Calif., a corporation of Delaware Application April 15, 1944, Serial No. 531,254

7 Claims. (Cl. 202—39.5)

This invention relates to a process for separating the azeotropic mixture obtained as distillate upon distilling a beta,gamma-olefinic alcohol in admixture with a saturated monocarboxylic acid ester of the beta,gamma-olefinic alcohol. More particularly, the invention pertains to an extractive distillation process employing kerosene for separating the azeotropic distillate mixture of allyl alcohol and allyl acetate.

In this application, the term "beta,gamma-olefinic alcohol" is used to designate a class of unsaturated alcohols having an olefinic, double bonded linkage between the two carbon atoms which are in the beta and gamma positions with respect to the saturated carbon atom to which the hydroxyl group of the alcohol is directly attached. In other words, the class of unsaturated alcohols with which the invention is concerned has an olefinic linkage between two carbon atoms one of which is directly linked to a saturated carbon atom having the hydroxyl group linked directly thereto. The lowest member of the beta,gamma-olefinic alcohols is allyl alcohol. Illustrations of other members of the class will be given hereinafter.

As described in our copending application, Serial No. 425,118, filed December 31, 1941, now U. S. Patent No. 2,473,124, of which this application is a continuation-in-part, polyallyl alcohol is obtained from polyallyl acetate by subjecting the polymeric ester to alcoholysis with monomeric allyl alcohol while distilling the formed monomeric allyl acetate from the reaction mixture substantially as fast as formed, the distillation being conducted at normal, subatmospheric or superatmospheric pressure. Since the reaction mixture contains monomeric allyl alcohol, the distillate obtained at normal pressure by the method is an azeotropic mixture of monomeric allyl alcohol and allyl acetate containing about 37% of the ester. The monomeric allyl acetate may be polymerized to polyallyl acetate which is the starting material used in the alcoholysis process. It is, however, desirable that the monomeric ester be substantially free of monomeric alcohol when subjected to polymerization. The present invention provides a method for separating the azeotropic mixture obtained by distilling allyl acetate in admixture with allyl alcohol as well as azeotropic mixtures of related unsaturated alcohols and their esters.

According to the process of the present invention, the azeotropic mixture obtained by distilling monomer of a beta,gamma-olefinic alcohol containing not more than 6 carbon atoms in admixture with monomer of a saturated monocarboxylic acid ester of the beta,gamma-olefinic alcohol, which ester contains not more than 12 carbon atoms, is separated by contacting the azeotropic mixture in a fractionating column with a normally liquid, non-polar hydrocarbon at a temperature above the boiling temperature of said monomeric alcohol, but below the boiling temperature of the hydrocarbon whereby the monomeric ester, substantially free of said monomeric alcohol, is absorbed in the hydrocarbon and vapors comprising monomer of the alcohol are evolved, the hydrocarbon having a normal boiling point at least 20° C. above the normal boiling point of the monomeric ester. The vapors evolved in this first operation are then separated from the ester-containing hydrocarbon and condensed. The ester-containing hydrocarbon is next distilled to free it of ester and there is collected as distillate therefrom the desired monomeric ester substantially free of said monomeric alcohol. The hydrocarbon obtained as residue from this distillation step is substantially free of ester, and returned for contact again with the ester-alcohol azeotrope being separated in the first-mentioned extractive distillation. The condensed vapors from this extractive distillation comprising monomeric alcohol also contain some monomeric ester. After condensation and collection of these vapors, the condensate, if desired, may be distilled whereby there is obtained as distillate the azeotropic mixture of alcohol and ester, the residue being monomeric alcohol substantially free of ester. The azeotropic mixture collected in this additional distillation may be returned to the extractive distillation for contact again with the hydrocarbon.

The azeotropic mixture separated by the process contains a beta,gamma-olefinic alcohol of not more than 6 carbon atoms and the corresponding saturated monocarboxylic acid ester of the alcohol. The alcohol can be either primary, secondary or tertiary, although primary alcohols are preferred. It is also preferred that the alcohol have the carbon atom of a terminal methylene group attached by an olefinic double bond to a carbon atom which is directly attached to a saturated carbon atom having the hydroxyl group linked directly thereto. Representative specific examples of the most preferred subclass of alcohols include such compounds as allyl alcohol, methallyl alcohol, ethallyl alcohol, buten-1-ol-3, penten-1-ol-3, hexen-1-ol-3, 3-methylbuten-1-ol-3, 3-methylpenten-1-ol-3, 2-methylbuten-1-ol-3, 2-methylpenten-1-ol-3, 2,3-dimethylbuten-1- ol-3, 4-chlorobuten-1-ol-3, etc. Other less preferred compounds include crotyl alcohol, tiglyl alcohol, angelyl alcohol, penten-2-ol-1, hexen-2-ol-1, 4-methylpenten-2-ol-1, penten-3-ol-2, 4-methylpenten-3-ol-2, cyclopenten-2-ol-1, cyclohexen-2-ol-1, etc. Among representative saturated monocarboxylic acid esters of the alcohol which are in azeotropic mixture therewith are beta,gamma-olefinic alcohol formates, acetates, propionates, butyrates, isobutyrates, valerates, chloracetates, dichloracetates, trichloracetates, bromacetates, methoxyacetates, caproates, caprylates, naphthenates, cyclopentane monocarboxylates, hexahydrobenzoates, etc. The ester contains not more than 12 carbon atoms.

The accompanying drawing is a flow diagram illustrating an embodiment of the invention utilized to separate the allyl alcohol-allyl acetate azeotrope by extractive distillation using kerosene, the azeotrope being obtained by distilling the reaction mixture upon subjecting polyallyl acetate to ester-exchange alcoholysis with allyl alcohol to produce polyallyl alcohol.

In the drawing monomeric allyl alcohol from storage vessel 11 is conveyed by pipe 12 to pump 13 which discharges into line 14 having valve 15 therein and the allyl alcohol is charged to reactor 16 in which the ester-exchange reaction is effected. The reactor is fitted with stirrer 17 and fractionating column 18 into which vapors are conveyed by conduit 19. Monomeric allyl acetate is conveyed from storage tank 21 by line 22 having therein valve 23 to pressure pump 24. Pressure pump 24 discharges through line 25 into coil 26 of polymerization unit 27. The material in the coil is kept circulating by means of pipe 28 leading to circulating pump 29 which discharges back to lengthy nickel coil 26 through pipe 30. The allyl acetate is admixed with about 2% nickel acetate as polymerization catalyst, and at the start of the operation, the allyl acetate is circulated through nickel coil 26 which is heated with hot oil to about 225° C. for about 2 to 3 hours. Polymerization unit 27 is then operated continuously by pumping allyl acetate into coil 26 so that the residence time therein is about 2 to 3 hours. The pressure supplied by pump 24 is sufficient to maintain the contents of coil 26 liquid, the pressure being regulated with pressure regulator valve 31. The product from the polymerization operation is a mixture of monomeric allyl acetate and polyallyl acetate. The formed polymer-monomer mixture passes through valve 31 to line 32 through valve 33 and by line 34 to flash fractionator 35 wherein the bulk of the unpolymerized allyl acetate is removed from the product of the polymerization treatment. Vapors from column 35 pass by line 36 to partial condenser 37 which provides reflux for operation of column 35. Uncondensed vapors of allyl acetate pass by line 38 to condenser and cooler 39 from which the condensate passes by line 40 through valve 41 to intermediate storage vessel 42. The residue from column 35 which contains the polyallyl acetate is removed through line 43 and valve 44 into line 45 passing to intermediate storage vessel 46. If desired, the intermediate fractionation of the product of polymerization is avoided in by-passing column 35 through closing of valves 33, 41 and 44 and opening valve 48 in line 47 whereby the crude polymer passes directly to vessel 46. The polyallyl acetate from vessel 46 is conveyed by pipe 51 to pump 52 which discharges through line 53 and valve 54 into reactor 16. Catalyst, consisting of sodium alloxide in solution with allyl alcohol, is transferred from vessel 55 by line 56 through valve 57 to reactor 16. The contents in reactor 16 are heated and boiled whereby the ester-exchange reaction giving monomeric allyl acetate and polyallyl alcohol occurs. The evolved allyl acetate along with allyl alcohol are fractionated in column 18 and distillate vapors consisting of the azeotropic mixture of those two compounds containing 37% allyl acetate and boiling at 95.1° C. pass by line 60 to partial condenser 61 which provides reflux for operation of the column. The allyl acetate is removed from reactor 16 substantially as fast as formed by the ester-exchange reaction. The uncondensed azeotropic mixture from partial condenser 61 is conveyed by pipe 62 to condenser and cooler 63 from which the condensed distillate passes by line 64 to intermediate storage vessel 65. Upon completion of the ester-exchange reaction, the product remaining in reactor 16 is a solution of polyallyl alcohol in monomeric allyl alcohol plus the catalyst, sodium alloxide. This solution is dropped out of reactor 16 through line 66 by opening valve 67 and passed to vessel 68 which is packed with cation-exchange resin such as Amberlite IR-1 which removes the catalyst. The catalyst-free solution is conveyed by line 69 to pump 70 which discharges the solution through pipe 71 to flash evaporator 72. Therein the monomeric allyl alcohol is vaporized from the polyallyl alcohol and the vapors pass by line 73 to partial condenser 74 thence through line 75 to condenser and cooler 76. The recovered allyl alcohol from condenser and cooler 76 is passed by line 77 to storage vessel 11. The residue from column 72, consisting of polyallyl alcohol, flows by line 78 to storage vessel 79.

The azeotropic mixture of allyl acetate and allyl alcohol which accumulates in vessel 65 is separated by extractive distillation using a kerosene with a boiling range of about 200° C. to 235° C. as auxiliary solvent. This material is contained in tank 120 from which it passes by line 121 to pump 122 which discharges by line 123 to preheater 124 thence into fractionating column 125. The kerosene enters column 125 three or four plates from the top so that there is a short rectifying section in the column above the point of entrance of the kerosene. The temperature of the incoming kerosene is kept at about 100° C. so that allyl alcohol vaporizes therefrom, but no substantial amount of allyl acetate goes overhead. The temperature of the incoming kerosene must be kept below the normal boiling point of the allyl acetate. The azeotrope of allyl acetate and allyl alcohol is fed from tank 65 by line 126 to pump 127 through pipe 128 to column 125. Column 125 is operated so that the ratio of kerosene to azeotropic feed is about 1:1 up to about 1:5. The bottom product is a mixture of kerosene and allyl acetate substantially free of allyl alcohol which is passed by line 129 to intermediate storage tank 130 from which it passes by line 131 to pump 132 which discharges through pipe 133 to fractionating column 134. The vaporous product from column 134 consisting of pure, or substantially pure allyl acetate, passes by pipe 135 to partial condenser 136 which supplies reflux needed for operation of column 134. Uncondensed allyl acetate passes from partial condenser 136 by pipe 137 to condenser and cooler 138 and then by line 139 to tank 42 to await polymerization in the cyclic system by being conducted thereto through line 59 to pump 24 upon opening valve 80 and closing valve 23. The residue from fractionator 134 is kerosene and is conveyed by line 140 to tank 120 for recycling in the azeotrope separation system.

The overhead product from column 125 will consist of allyl alcohol with a minor proportion of allyl acetate. Vapors of this material are conducted by line 141 to partial condenser 142 which supplies reflux for the rectifying section of column 125. Partial condenser 142 is operated so that the reflux ratio is from about 1:1 up to about 10:1. The higher the ratio, the purer the allyl alcohol, although the purity is also dependent upon the kerosene to feed ratio. Uncondensed vapors from partial condenser 142 pass by line 143 to condenser and cooler 144 thence by line 145 to intermediate storage vessel 146. The allyl alcohol, containing a small amount of allyl acetate associated therewith, is conveyed from tank 146 by pipe 150 to pump 151 which discharges into line 152. Valve 164 is closed and valve 153 opened so that the material passes by line 154 to fractionating column 155. The distillate of vapors obtained in fractionator 155 is the allyl alcohol-allyl acetate binary azeotrope which passes by line 156 to partial condenser 157 which supplies reflux for column 155. Uncondensed vapors of the binary azeotrope pass by line 158 to condenser and cooler 159 from which the condensate passes by pipe 160 having valve 161 therein to tank 65 and is recirculated through the azeotrope separation system. The residue from column 155 is substantially pure allyl alcohol which is conveyed by pipe 162 through valve 163 to the allyl alcohol storage vessel 11. If desired, the allyl alcohol, containing a minor amount of allyl acetate, from tank 146 can be conveyed directly to the allyl alcohol storage vessel 11 by opening valve 164 and passing it through pipe 165; in this case, column 155 is cut out of service by closing valves 153, 161 and 163. The allyl acetate conducted into the allyl alcohol charging stock passes to the ester-exchange unit from which it recirculates through the system.

While the process of the invention has been described and illustrated in the drawing with reference to producing polyallyl alcohol by means of allyl acetate and separating the formed alcohol-ester azeotrope by extractive distillation using kerosene, the process is suitable for application in producing other polymeric alcohols from monomeric beta,gamma-olefinic alcohols containing not more than 6 carbon atoms by use of their saturated monocarboxylic acid esters containing not more than 12 carbon atoms. In place of kerosene, any normally liquid non-polar hydrocarbon which has a normal boiling point at least 20° C. above that of the monomeric ester can be used. In the extractive distillation method of separating the alcohol-ester azeotrope, the solvent does not appreciably vaporize in the fractionating column because of its higher boiling point. Since the solvent is separated from the ester with which it becomes associated by distillation, a difference of at least 20° C. between their boiling points is necessary so that their separation is feasible and efficient. Other hydrocarbons suitable as solvents include toluene, xylene, ethylbenzene, mesitylene, hemimellethene, cumene, pseudocumene, crotylbenzene, cymene, octane, nonane, decane, dodecane, tetradecane, pentadecane, methylcyclohexane, ethylcyclohexane, butylcyclohexane, dimethylcyclohexane, p-menthane, and the like.

The hydrocarbons can be used either as pure compounds or in admixture with one another as is the case with the preferred solvent, kerosene.

The kerosene can be refined kerosene which is substantially free of aromatics and is preferred to unrefined material containing appreciable amounts of aromatics.

The choice of the solvent requires exercise of judgment. Thus, when using allyl formate (B. P. 83° C.), toluene (B. P. 111° C.) is suitable as solvent, but toluene cannot be used with allyl acetate (B. P. 104° C.) or methallyl isobutyrate (B. P. 152° C.) because there is not the required 20° C. higher boiling point of the solvent over that of the ester.

We claim:

1. A process for separating the azeotropic mixture obtained by distilling monomer of a beta,-gamma-olefinic alcohol in admixture with monomer of a saturated monocarboxylic acid ester of the beta, gamma-olefinic alcohol, said monomeric alcohol containing not more than 6 carbon atoms and said monomeric ester containing not more than 12 carbon atoms, which comprises contacting said mixture with a normally liquid, nonpolar hydrocarbon at a temperature above the boiling temperature of said monomeric alcohol, but below the boiling temperature of the hydrocarbon whereby said monomeric ester, substantially free of said monomeric alcohol, is absorbed in the hydrocarbon and vapors comprising monomer of said alcohol are evolved, said hydrocarbon having a normal boiling point at least 20° C. above the normal boiling point of said monomeric ester; separating said vapors and the ester-containing hydrocarbon; condensing said vapors; distilling the ester-containing hydrocarbon so as to obtain as residue substantially ester-free hydrocarbon; returning the ester-free hydrocarbon for contact again with ester-alcohol azeotrope; and collecting as distillate monomeric ester substantially free of said monomeric alcohol.

2. A process for separating the azeotropic mixture obtained by distilling monomer of a beta,-gamma-olefinic alcohol in admixture with monomer of a saturated monocarboxylic acid ester of the beta,gamma-olefinic alcohol, said monomeric alcohol containing not more than 6 carbon atoms and said monomeric ester containing not more than 12 carbon atoms, which comprises contacting said azeotropic mixture with kerosene at a temperature above the boiling temperature of said monomeric alcohol, but below the boiling temperature of the kerosene whereby said monomeric ester, substantially free of said monomeric alcohol, is absorbed in said kerosene and vapors comprising monomer of said alcohol are evolved; separating said vapors and the ester-containing kerosene; condensing said vapors and distilling the condensate whereby substantially ester-free alcohol is obtained as residue and azeotropic mixture of alcohol and ester is produced as distillate; returning the distillate for contact again with the kerosene; distilling the ester-containing kerosene so as to obtain as residue substantially ester-free kerosene; returning the ester-free kerosene for contact again with alcohol-ester azeotrope; and collecting as distillate substantially alcohol-free monomeric ester.

3. A process for separating the azeotropic mixture obtained by distilling allyl alcohol in admixture with allyl acetate which comprises contacting said mixture with a normally liquid, nonpolar hydrocarbon at a temperature above the boiling temperature of allyl alcohol, but below the boiling temperature of the hydrocarbon whereby allyl acetate substantially free of allyl alcohol is absorbed in the hydrocarbon and vapors comprising allyl alcohol are evolved, said hydrocarbon having a normal boiling point at least 20° C. above the normal boiling point of allyl acetate; separating said vapors and the ester-containing hydrocarbon; condensing said vapors; distilling the ester-containing hydrocarbon so as to obtain as residue substantially ester-free hydrocarbon; returning the ester-free hydrocarbon for contact again with allyl alcohol-allyl acetate azeotrope; and collecting as distillate substantially allyl alcohol-free allyl acetate.

4. A process for separating the azeotropic mixture obtained by distilling allyl alcohol in admixture with allyl acetate which comprises contacting said azeotropic mixture with kerosene at a temperature above the boiling temperature of the alcohol, but below the boiling temperature of the kerosene whereby allyl acetate substantially free of alcohol is absorbed in the kerosene and vapors comprising allyl alcohol are evolved; separating said vapors and the ester-containing kerosene; condensing said vapors and distilling the condensate whereby substantially ester-free alcohol is obtained as residue and azeotropic mixture of alcohol and ester is produced as distillate; returning the distillate for contact again with the kerosene; distilling the ester-containing kerosene so as to obtain as residue substantially ester-free kerosene; returning the ester-free kerosene for contact again with alcohol-ester azeotrope; and collecting as distillate substantially alcohol-free allyl acetate.

5. A process for separating the azeotropic mixture obtained by distilling allyl alcohol in admixture with allyl acetate which comprises contacting said azeotropic mixture with kerosene at a temperature above the boiling temperature of the alcohol, but below the boiling temperature of the kerosene whereby allyl acetate substantially free of alcohol is absorbed in the kerosene and vapors comprising allyl alcohol are evolved; separating said vapors and the ester-containing kerosene; condensing said vapors; distilling the ester-containing kerosene so as to obtain as residue substantially ester-free kerosene; returning the ester-free kerosene for contact again with allyl acetate-allyl alcohol azeotrope; and collecting as distillate substantially allyl alcohol-free allyl acetate.

6. A process for separating the azeotropic mixture obtained by distilling allyl alcohol in admixture with allyl formate which comprises contacting said mixture with a normally liquid, nonpolar hydrocarbon at a temperature above the boiling temperature of allyl alcohol, but below the boiling temperature of the hydrocarbon whereby allyl formate substantially free of allyl alcohol is absorbed in the hydrocarbon and vapors comprising allyl alcohol are evolved, said hydrocarbon having a normal boiling point at least 20° C. above the normal boiling point of allyl formate; separating said vapors and the ester-containing hydrocarbon; condensing said vapors; distilling the ester-containing hydrocarbon so as to obtain as residue substantially ester-free hydrocarbon; returning the ester-free hydrocarbon for contact again with allyl alcohol-allyl formate azeotrope; and collecting as distillate substantially allyl alcohol-free allyl formate.

7. A process for separating the azeotropic mixture obtained by distilling allyl alcohol in admixture with allyl formate which comprises contacting said azeotropic mixture with kerosene at a temperature above the boiling temperature of the alcohol, but below the boiling temperature of the kerosene whereby allyl formate substantially free of alcohol is absorbed in the kerosene and vapors comprising allyl alcohol are evolved; separating said vapors and the ester-containing kerosene; condensing said vapors and distilling the condensate whereby substantially ester-free alcohol is obtained as residue and azeotropic mixture of alcohol and ester is produced as distillate; returning the distillate for contact again with the kerosene; distilling the ester-containing kerosene so as to obtain as residue substantially ester-free kerosene; returning the ester-free kerosene for contact again with alcohol-ester azeotrope; and collecting as distillate substantially alcohol-free allyl formate.

DAVID E. ADELSON.
THEODORE W. EVANS.

REFERENCES CITED

The following references are of record in the file of this patent:

UNITED STATES PATENTS

| Number | Name | Date |
|---|---|---|
| 1,672,156 | Hermann et al. | June 5, 1928 |
| 2,107,265 | Archibald | Feb. 8, 1938 |
| 2,109,883 | Hermann et al. | Mar. 1, 1938 |
| 2,135,626 | Robie | Nov. 8, 1938 |
| 2,155,591 | Garvey | Apr. 25, 1939 |
| 2,318,959 | Muskat et al. | May 11, 1943 |
| 2,332,460 | Muskat et al. | Oct. 19, 1943 |
| 2,332,900 | D'Alelio | Oct. 26, 1943 |
| 2,339,160 | Dunn et al. | Jan. 11, 1944 |
| 2,349,507 | Benedict | May 30, 1944 |
| 2,360,859 | Evans et al. | Oct. 24, 1944 |

OTHER REFERENCES

Ryan et al., article in J. Am. Chem. Soc., 62, 3469 (1940).